(12) United States Patent
Kumagai et al.

(10) Patent No.: US 6,204,498 B1
(45) Date of Patent: *Mar. 20, 2001

(54) INCLINATION SENSOR AND SURVEYING INSTRUMENT USING THE SAME

(75) Inventors: Kaoru Kumagai; Fumio Ohtomo, both of Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/168,261

(22) Filed: Oct. 8, 1998

(30) Foreign Application Priority Data

Oct. 8, 1997  (JP) .................................................. 9-293533

(51) Int. Cl.⁷ ..................................................... G01C 9/06
(52) U.S. Cl. ................................... 250/222.1; 250/231.1; 33/366; 33/390; 356/249
(58) Field of Search ............................... 250/221, 222.1, 250/216, 231.1, 231.13; 356/138, 139.1, 148, 152.1, 249; 33/366, 365, 377, 390

(56) References Cited

U.S. PATENT DOCUMENTS 4,993,162 * 2/1991 Scholian ................................ 33/366
5,392,112 * 2/1995 Nakamura ........................... 356/139.1
5,513,001 * 4/1996 Ohtomo ................................. 356/249
5,893,215 * 4/1999 Kumagai et al. ....................... 33/366

\* cited by examiner

Primary Examiner—John R. Lee
(74) Attorney, Agent, or Firm—Baker Botts L.L.P.

(57) ABSTRACT

The present invention relates to an inclination sensor which utilizes a liquid member having a free surface. A first optical system collimates light emitted from a light source, a dark field pattern allows the light from the first optical system to pass therethrough, a half mirror changes the direction of the light which has passed through the scale pattern, a first liquid member having a free surface reflects the pattern light thus changed its direction by the half mirror, a second optical system focuses the pattern light reflected by the first liquid member, a light receiving means receives a light image formed by the second optical system, and a processing means calculates an inclination on the basis of a reception signal provided from the light receiving means. The scale pattern is formed by a plurality of slits, and the half mirror is disposed on an optical path of both the liquid member and the second optical system.

10 Claims, 7 Drawing Sheets

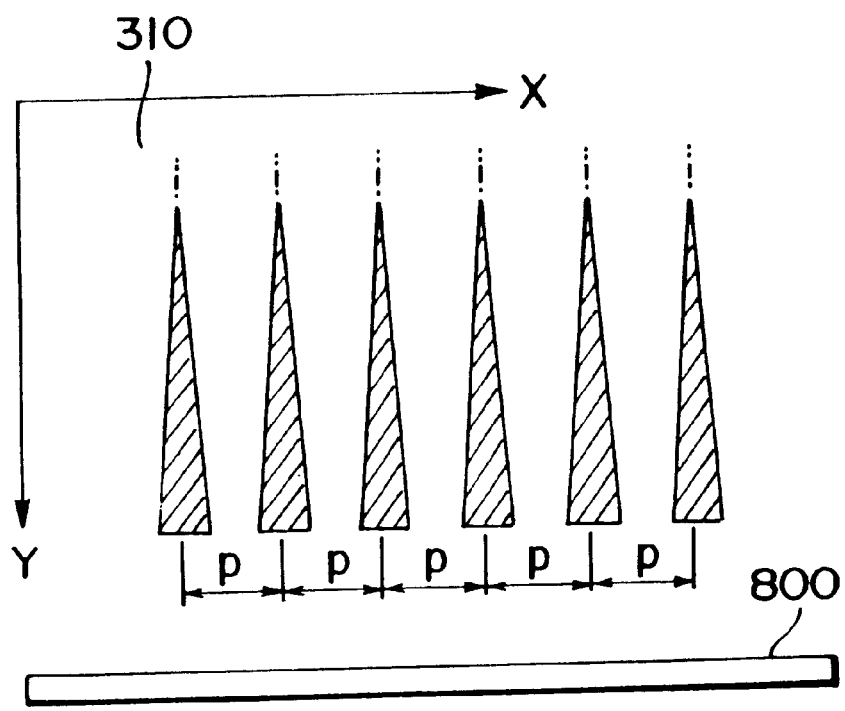

$dy_{AVE} = (dy_1 + dy_2 + \cdots + dy_m)/m$

20000

INCLINATION SENSOR AND SURVEYING INSTRUMENT USING THE SAME

BACKGROUND OF THE INVENTION

The present invention relates to an inclination sensor which utilizes a liquid member having a free surface. In particular, the invention is concerned with an inclination sensor best suited for a surveying instrument and capable of being constituted in a compact form by disposing a half mirror on an optical path of both the liquid member and a light receiving optical system, as well as a surveying instrument using the inclination sensor.

Heretofore, as a device for detecting inclinations of a surveying instrument there has been used such a bubble tube 10000 as shown in FIG. 9. In the interior of the bubble tube 10000, bubbles 5000 are sealed and electrodes 6000 and 7000 are formed, to measure a capacitance electrically and thereby determine an inclination.

However, since the outer peripheral portion of the bubble tube 10000 is formed of glass, it is weak against impact and a high mechanical accuracy is required, thus giving rise to the problem that the cost is high.

Further, for measuring inclinations in both X- and Y-axis directions, it is necessary to use two bubble tubes 10000 in two-axis directions, thus causing an increase of cost.

Additionally, the bubble tube 10000 is also influenced by changes in ambient temperature and hence it has so far been required to make correction of temperature changes.

SUMMARY OF THE INVENTION

In the present invention, which relates to an inclination sensor using a liquid member having a free surface, a first optical system collimates light emitted from a light source, a scale pattern allows the light from the first optical system to mass therethrough, a half mirror changes the direction of the light which has passed through the dark field pattern, a first liquid member having a free surface reflects the pattern light thus changed its direction by the half mirror, a second optical system focuses the pattern light reflected by the first liquid member, a light receiving means receives the light image formed by the second optical system, and a processing means calculates an inclination on the basis of a reception signal provided from the light receiving means. The scale pattern is formed by a plurality of slits, and the half mirror is disposed on the optical path of both the liquid member-and the second optical path.

BRIEF DESCRIPTION OF THE DRAWINGS

The accompanying drawings illustrate embodiments of the present invention, in which:

FIG. 2 is a scale pattern having a geometrical figure constructed as a triangle pattern in the first embodiment;

DETAILED DESCRIPTION OF THE PREFERRED EMBODIMENTS

Embodiments of the present invention will be described hereinunder with reference to the drawings.

[First Embodiment]

Figure 1:
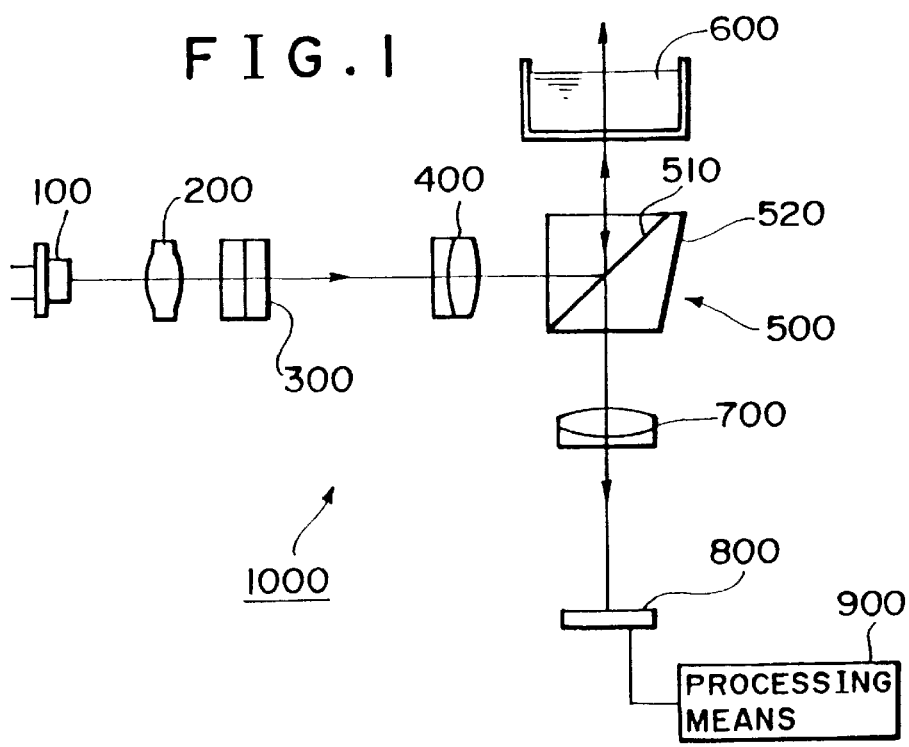
FIG. 1 is a diagram showing the construction of an inclination sensor according to a first embodiment of the invention.

FIG. 1 illustrates an optical construction of an inclination sensor 1000 according to a first embodiment of the invention. The inclination sensor 1000 comprises a light source 100, a condenser lens 200, scale pattern (a dark field pattern) 300, a first pattern relay lens 400, a half mirror 500, a first liquid member 600 having a free surface, a second pattern relay lens 700, a light receiving means 800, and a processing means 900.

The light source 100 used in the first embodiment is a light emitting diode (LED), provided any other light source may be used.

The condenser lens 200, which is for collimating the light emitted from the light source 100, corresponds to a first optical system.

The scale pattern 300 is for forming a pattern image in the light receiving means 800.

FIG. 2 illustrates a scale pattern 300 used in the first embodiment, which pattern is composed of plural slits 310, 310, . . . It is here assumed that the direction orthogonal to the plural slit s 310, 310, . . . is x direction and that the longitudinal direction of each slit 310 is Y direction.

The plural slits 310, 310, . . . are arranged in such a manner that their central points are spaced from one another at equal intervals P and that the slit width varies in a direction orthogonal to the arranged direction of the slits.

The first pattern relay lens 400 is for conducting the light which has passed through the scale pattern 300 to the half mirror 500.

A half mirror 500 used in this first embodiment is a beam splitter having a semitransparent sur-ace 510. The light incident on the half mirror 500 is reflected by the semitransparent surface 510, then advances upward and enters a first liquid member 600 having a free surface. The light is reflected by the first liquid member 600 having a tree surface, then passes through the semitransparent surface 510 of the half mirror 500 and advances toward a light receiving means 800 located at a lower position.

The half mirror 500 has a slant surface 520 which is inclined relative to the transmitted light from a light source 100.

The light emitted from the light source 100 and incident on the halt mirror 500 is reflected by the semitransparent surface 510 and advances upward, but a portion thereof passes through the semitransparent surface 510 and travels straight ahead. If a portion of the light traveling straight ahead is reflected by an end face of the half mirror 500 and then travels in the opposite direction on the same optical path, it will be again reflected by the semitransparent surface 510 and advance toward the light receiving means 800 located at a lower position.

The light passing through the semitransparent surface 510 and traveling straight ahead may obstruct the inclination detection or produce an error. In this first embodiment, to avoid such an inconvenience, the above end face of the half mirror 500 is formed as a slant surface 520 which is inclined relative to the transmitted light from the light source.

As a result, the light from the light source 100 which travels straight ahead after passing through the semitransparent surface 510 is reflected by the slant surface 520, but the reflected light does not travel in the opposite direction on the same optical path and is therefore not directed to the light receiving means 800, thus making it possible to effect a high accuracy measurement.

The light source 100 and the surface of the first liquid member 600 having a free surface for reflecting the light from the light source may be disposed in a conjugate relation to each other.

In this case, the reflection area on the surface of the first liquid member 600 becomes minimum and hence it is possible to minimize the error based on the surface tension of the liquid. Further, it is also possible to diminish the volume of the first liquid member 600.

The first liquid member 600 having a free surface is filled with a liquid having a moderate viscosity, e.g. silicone oil. Since the first liquid member 600 has a free surface, the surface thereof is sure to be held level.

The second pattern relay lens 700 is for focusing the light which has been reflected by the first liquid member 600 having a free surface and which has passed through the half mirror 500, onto the light receiving means 800. That is, the second pattern relay lens 700 is for forming an image of the scale pattern 300 onto the light receiving means 800.

The second pattern relay lens 700, which corresponds to a second optical system, is disposed at a position spaced a focal distance, f, of the lens 700 from the light receiving means 800.

The light receiving means 800 is for receiving a light image of the scale pattern 300 and converting it into an electrical signal. A CCD (charge-coupled device) linear sensor is used as the light receiving means in this embodiment.

The processing means 900, including a CPU, is for making a total control and calculating a shift distance of slit image in the scale pattern 300 to determine a corresponding inclination angle.

In this first embodiment constructed as above, when the inclination sensor 1000 inclines, the free surface of the first liquid member 600 is kept level, so that the image of the scale pattern 300 on the light receiving means 800 shifts in proportion to the angle of inclination.

Figure 6:
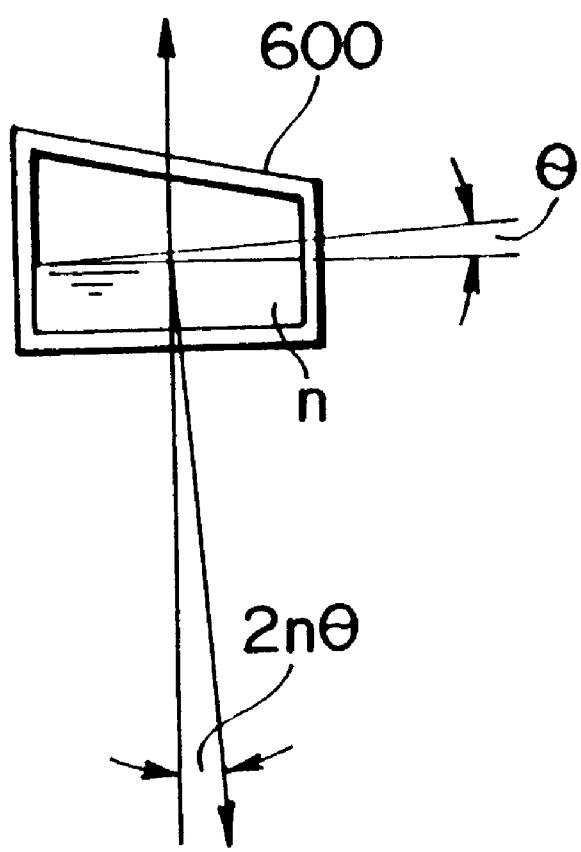
FIG. 6 is a diagram explaining a first liquid member.

In the case, as describes in FIG. 6, where the inclination sensor 1000 inclines at an angle of θ, then if the refractive index of the first liquid member 600 is n, it follows that the light reflected from the free surface inclines 2nθ. Given that the corresponding distance on the linear sensor as the light receiving means 800 is L:

$$L = f \times \tan(2n\theta) \quad \text{Formula 1}$$

Therefore, if the amount of shift of the slits 310 in the scale pattern 300 is detected by the light receiving means 800 and is converted to an inclination angle by the processing means 900, it is possible to determine the inclination θ of the inclination sensor 1000.

[Second Embodiment]

Figure 3:
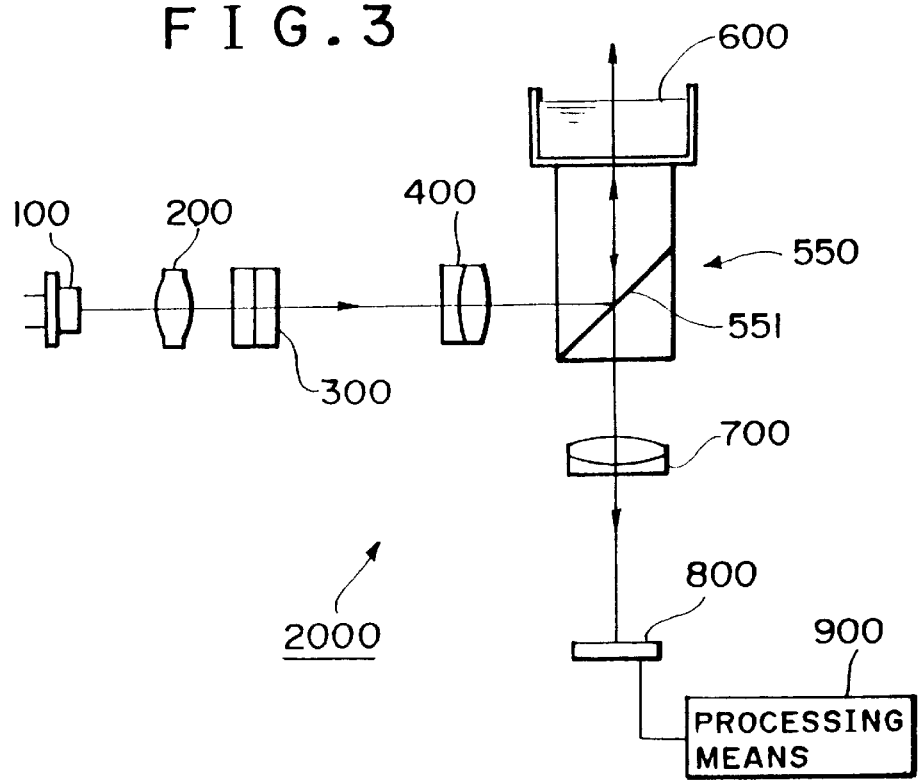
FIG. 3 is a diagram showing the construction of an inclination sensor according to a second embodiment of the invention.

FIG. 3 illustrates an optical construction of an inclination sensor 2000 according to a second embodiment of the present invention. The inclination sensor 2000 comprises a light source 100, a condenser lens 200, a scale pattern 300, a first pattern relay lens 400, a sealing vessel 550, a first liquid member 600 having a free surface, a second pattern relay lens 700, a light receiving means 800, and a processing means 900.

The sealing vessel 550 is for making a semitransparent surface 551 and the liquid member 600 having a free surface integral with each other. That is, the sealing vessel 550 is for making a half mirror and the first liquid member 600 integral with each other.

In this second embodiment, the light emitted from the light source 100 is reflected by the semitransparent surface 551 in the sealing vessel 550 and advances upward, then enters the first liquid member 600 having a free surface. The light is then reflected by the first liquid member 600, passes through the semitransparent surface 551 in the sealing vessel 550 and advances toward the light receiving means 800 located at a lower position.

As to the light incident on the semitransparent surface 551 from the light source 100, there occurs a reflected light not only on the incident surface of the sealing vessel 550 but also on the boundary surface between the sealing vessel and the first liquid member 600. This reflected light may obstruct the inclination detection or give rise to an error.

In view of this point, the half mirror and the first liquid member 600 are rendered integral with each other by the sealing vessel 550 and the refractive index values of the sealing vessel 550, the first liquid member 600 and the semitransparent surface 551 are made equal or approximate, whereby it is made possible to prevent the occurrence of unnecessary reflected light and attain a high accuracy measurement.

Further, if a reflection preventing film using a medium whose refractive index is intermediate between the refractive index of the sealing vessel 550 and that of the first liquid member 600 is formed on the contact surface of the sealing vessel in contact with the first liquid member, it is possible to diminish the occurrence of reflected light at this boundary.

Other constructional points are the same as in the first embodiment and therefore explanations thereof will be omitted.

[Third Embodiment]

Figure 4:
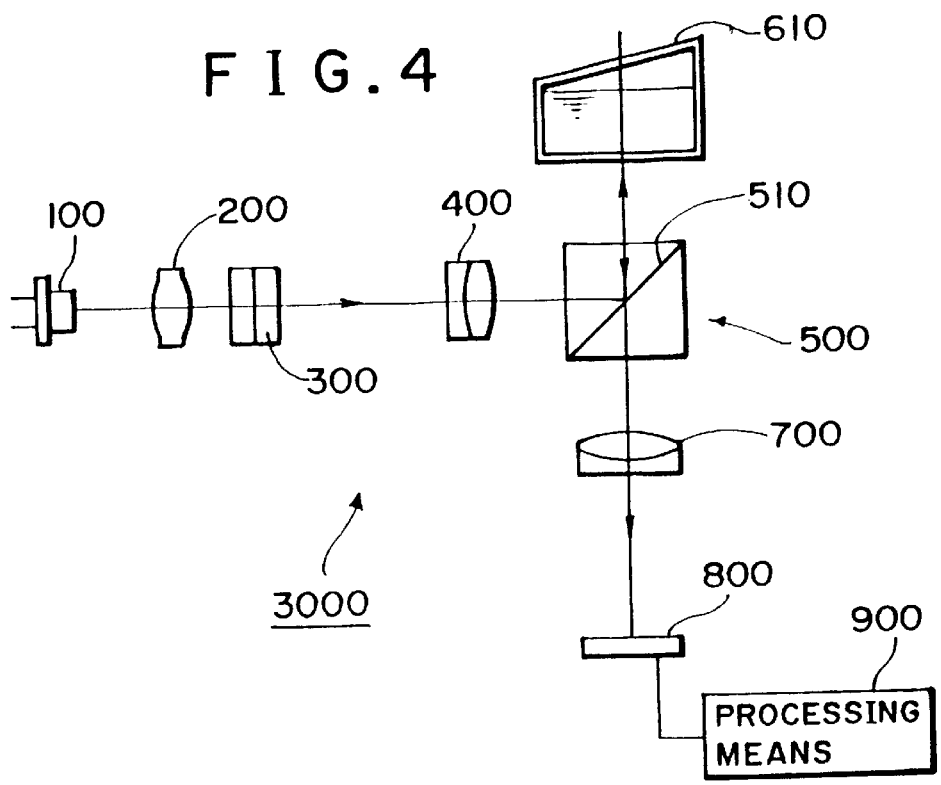
FIG. 4 is a diagram showing the construction of an inclination sensor according to a third embodiment of the invention.

FIG. 4 illustrates an optical construction of an inclination sensor 3000 according to a third embodiment of the present invention. The inclination sensor 3000 comprises a light source 100, a condenser lens 200, a scale pattern 300, a first pattern relay lens 400, a half mirror 500, a first liquid member 600 having a free surface, a second pattern relay lens 700, a light receiving means 800, and a processing means 900.

The first liquid member 600 having a free surface is sealed in a vessel 610 whose upper surface is inclined.

Light which has been reflected by the half mirror 500 and entered the first liquid member 600 having a free surface is reflected several percent by the free surface, then passes through a semitransparent surface 510 of the half mirror 500 and becomes incident on the light receiving means 800. However, 90% or more of the light incident on the first liquid member 600 passes through the first liquid member.

The light which has passed through the first liquid member 600 is reflected by the upper surface of the vessel 610. If this light reflected by the vessel upper surface returns along the same optical path, it will pass through the semitransparent surface 510 of the half mirror 500 and enters the light receiving means 800, resulting in that the inclination detection will be obstructed or an error will occur with a fairly high probability.

However, since the upper surface of the vessel 610 is inclined, the reflected light does not travel in the opposite direction on the same optical path and is therefore not applied to the light receiving means 800, thus making it possible to effect a high accuracy measurement.

Other constructional points are the same as in the first and second embodiments and therefore explanations thereof will be omitted.

[Fourth Embodiment]

Figure 5:
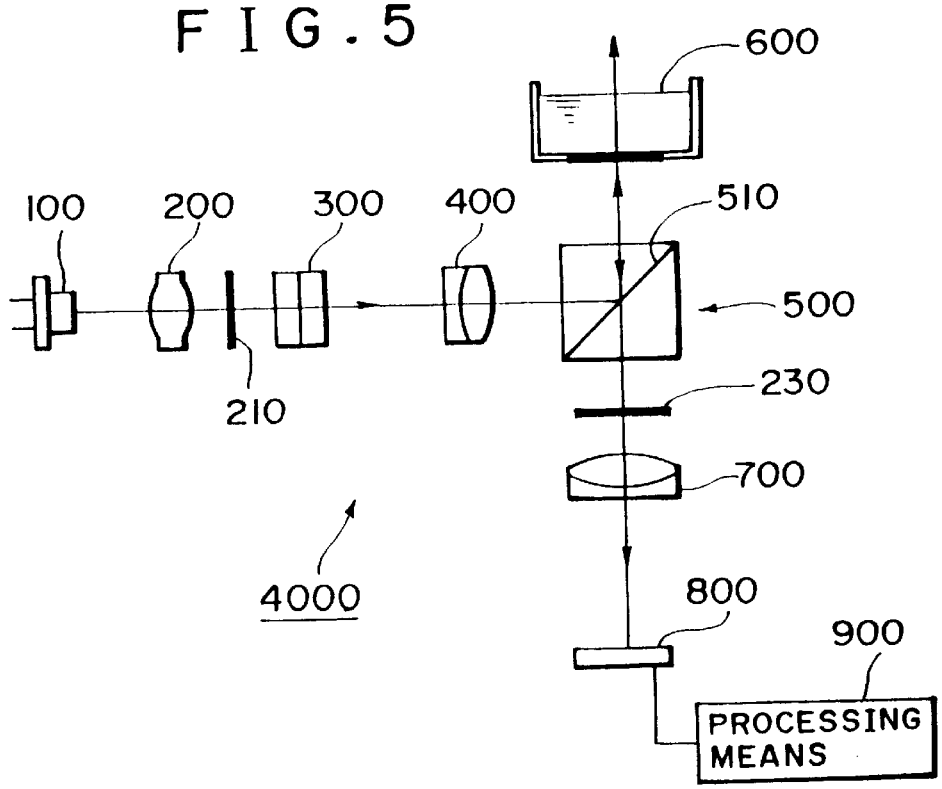
FIG. 5 is a diagram showing the construction of an inclination sensor according to a fourth embodiment of the invention.

FIG. 5 illustrates an optical construction of an inclination sensor 4000 according to a fourth embodiment of the present invention. The inclination sensor 4000 comprises a light source 100, a condenser lens 200, a first polarizing means 210, a scale pattern 300, a first pattern relay lens 400, a half mirror 500, a λ/4 polarizing means 220, a first liquid member 600 having a free surface, a second polarizing means 230, a second pattern relay lens 700, a light receiving means 800, and a processing means 900.

Light emitted from the light source 100 passes through the condenser lens 200 and is then polarized linearly by the first polarizing means 210. The linearly polarized light is then reflected upward by a semitransparent surface 510 of the half mirror 500 and enters the λ/4 polarizing means, in which it is transformed into a circularly polarized light.

The light thus circularly polarized by the λ/4 polarizing means 220 is directed to the first liquid member 600 and is reflected by the free surface, then enters the λ/4 polarizing means 220 again.

In the λ/4 polarizing means, the light which has been linearly polarized by the first polarizing means 210 can be made into light which is different in the direction of polarization by only π/2.

Therefore, if the second polarizing means 230 is disposed so as to pass therethrough only the light which has been reflected by the free surface of the first liquid member 600 (the light which has passed twice through the λ/4 polarizing means 220), then unnecessary reflected light other than the light reflected by the free surface of the first liquid member 600 is prevented from entering the light receiving means 800 and it is possible to effect a high accuracy measurement.

Instead of the second polarizing means 230, a polarization beam splitter having a polarizing reflective surface may be used as the half mirror 500, whereby the same effect as above can be obtained.

Other constructional points are the same as in the first to third embodiments and therefore explanations thereof will be omitted.

A detailed description will be given below about an inclination angle calculating process performed by the processing means 900.

A linear sensor serving as the light receiving means 800 is disposed in a direction (X direction) orthogonal to the image of plural slits 310, 310, . . .

Figure 7:
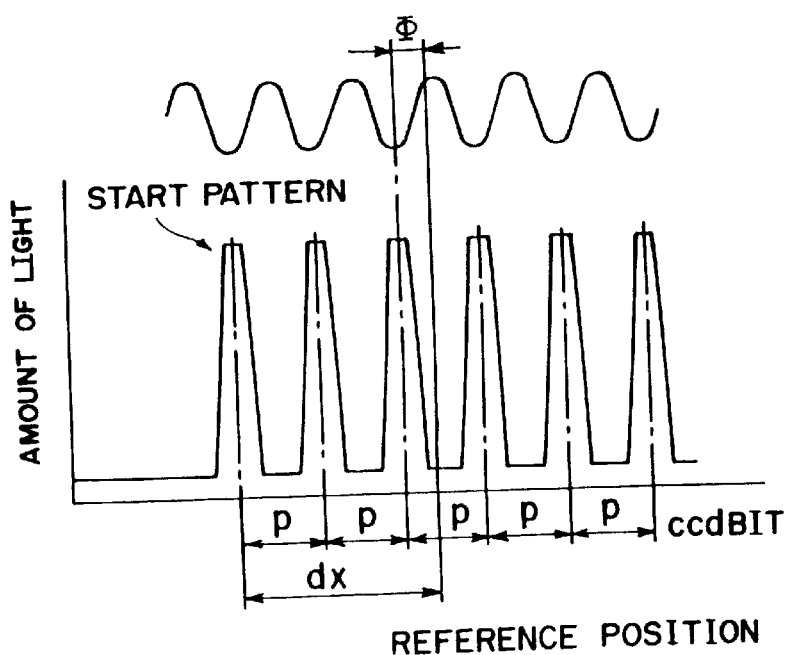
FIG. 7 is a diagram explaining an inclination angle calculating process performed by a processing means.

As to the inclination angle, therefore, it can be determined by taking note of a specific pattern of slits 310, . . . as a start pattern and measuring a distance, dx, from a preset level position as a reference position, as shown in FIG. 7.

As to a distance shorter than the distance of each pitch, it can be determined with a high accuracy by performing Fourier transformation for the output of the linear sensor to calculate a phase difference φ between the pitch and the level position as the reference position and by solving the following formula:

$$\phi \times p/(2\pi) \qquad \text{Formula 2}$$

Then, by combining the distance thus determined with a distance longer than the pitch obtained from the foregoing distance of the start pattern, it is possible to determine the total distance.

On the basis of the total amount of shift the processing means 900 can calculate a corresponding inclination angle in the X direction.

As to the angle of inclination in the Y direction, it is calculated using a triangular slit 310b having a varying width.

More specifically, Since the linear sensor is disposed in the X direction, inclination thereof in the Y direction causes a change in the light receiving width of the triangular slit 310b. The processing means 900 can calculate the angle of inclination in the Y direction.

Figure 8:
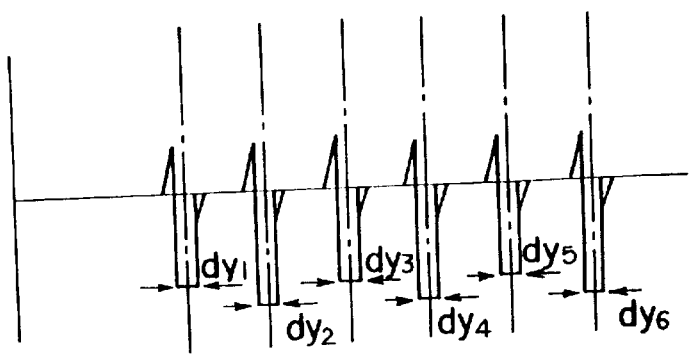
FIG. 8 is a diagram explaining an inclination angle calculating process performed by the processing means.
Figure 9:
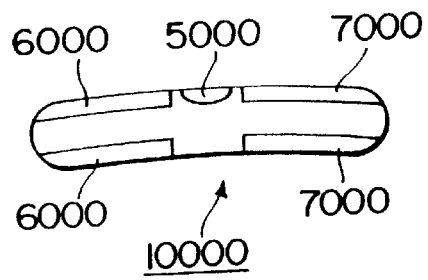
FIG. 9 is a diagram explaining the prior art.

In measuring the width in the Y direction, as shown in FIG. 8, the distance between leading and trailing edges in the output of the linear sensor can be determined by differentiating the said output. Further, for the purpose of enhancing the measurement accuracy, the distance L on the linear sensor can be expressed as follows by performing calculation for all signals, determining an average width $dy_{ave}$, and using a pitch width, p, obtained by Fourier transform and also using a predetermined proportional relation, k:

$$L = k \times dy_{ave}/p \qquad \text{Formula 3}$$

Further, inclination in the Y direction can be calculated from Formula 1.

The width varying slit is not limited to a triangular shape. It may be of any other shape insofar as the width thereof varies and a correspondence to inclination can be set.

Thus, by merely using a single linear sensor, it is possible to detect inclinations in two-axis directions, i.e., X and Y directions.

The adoption of an area sensor, not a linear sensor, and the use of plural slits 310, 310, . . . formed at equal intervals, permit detection of inclinations in two X- and Y-axis directions.

Further, the first liquid member 600 having a free surface may be substituted by a swingable suspended member.

Figure 10:
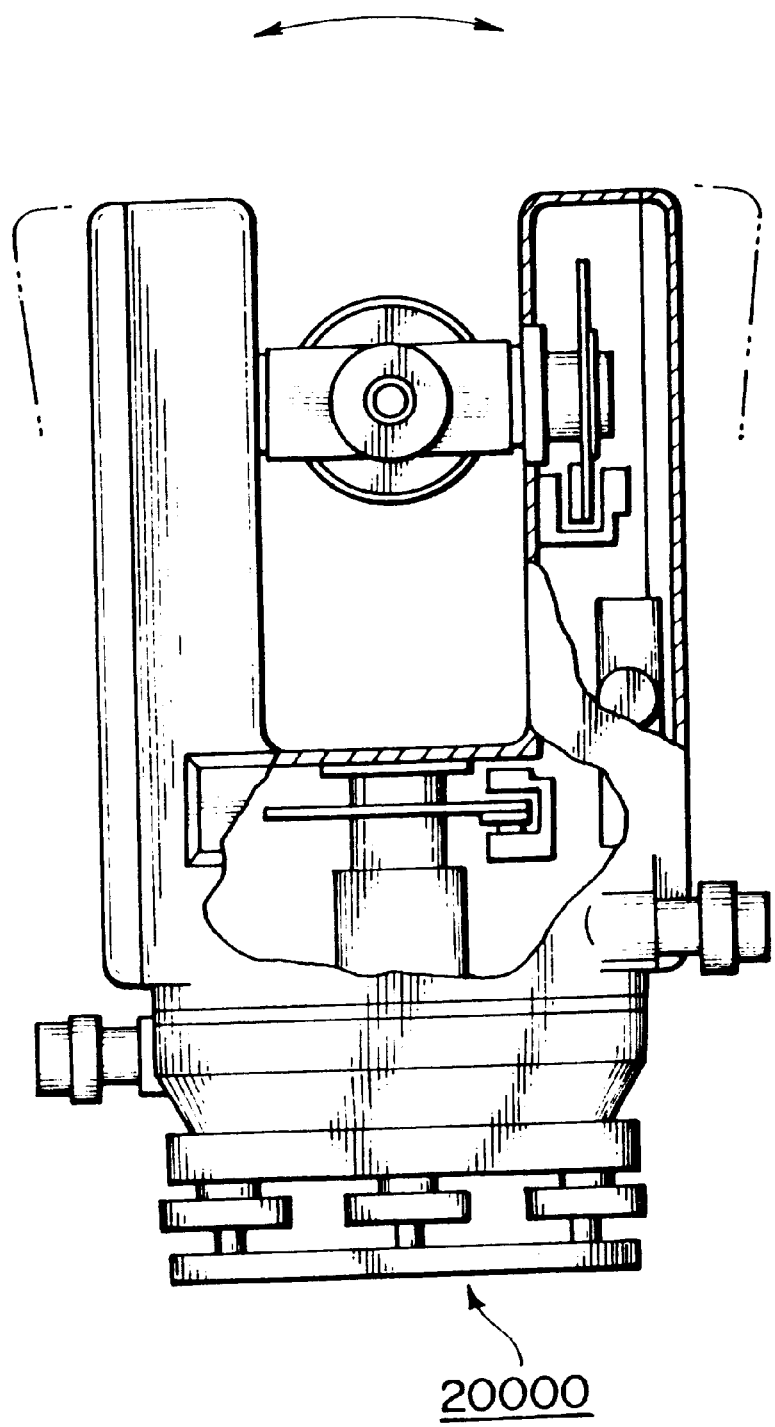
FIG. 10 is a diagram showing an example in which the invention is applied to an electronic theodolite.
Figure 11:
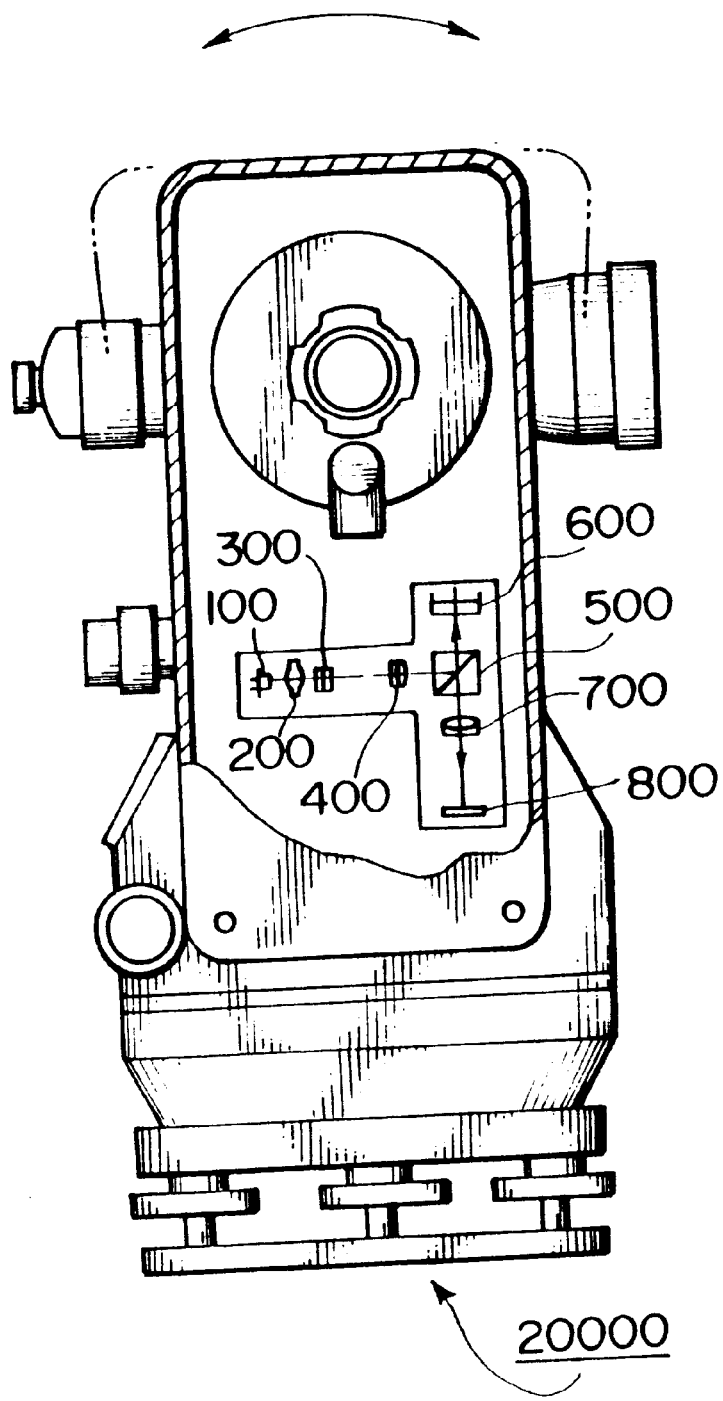
FIG. 11 is a diagram showing an example in which the invention is applied to the electronic theodolite.

If the inclination sensor is attached to, for example, such an electronic type theodolite 20000 as shown in FIGS. 10 and 11, it is possible to detect inclinations in both X and Y directions of the surveying instrument body.

According to the present invention constituted as above, the first optical system collimates the light emitted from the light source, the dark field pattern allows the light provided from the first optical system to pass therethrough, the half mirror changes the direction of the light which has passed through the dark field pattern, the first liquid member having a free surface reflects the pattern light thus changed its direction by the half mirror, the second optical system focuses the pattern light reflected by the first liquid member, the light receiving means receives the light image formed by the second optical system, and the processing means calculates an inclination on the basis of a reception signal provided from the light receiving means. The dark field pattern is formed by a plurality of slits and the half mirror is disposed on the optical path of both the liquid member and the second optical system, so that it is possible to provide an inclination sensor which is not only high in both mechanical strength and accuracy but also compact in size.

In the present invention, if the light source and the surface of the liquid member having a free surface for reflecting the light from the light source are arranged in a conjugate relation to each other, the area of reflection on the surface of the liquid member becomes minimum and hence it is possible to minimize the error based on the surface tension of liquid. It is also possible to decrease the volume of the liquid member.

Since the half mirror used in the present invention can have a surface which is inclined relative to the transmitted light from the light source, the reflected light never travels in the opposite direction on the same optical path and therefore the incidence of unnecessary reflected light on the light receiving means is prevented, thus making it possible to effect a high accuracy measurement.

According to the present invention, moreover, the first polarizing means is disposed on the optical path between the light source and the half mirror, a λ/4 polarizing means is provided on the light transmitting side of liquid member, and for the transmitted light from the half mirror the second polarizing means permits only the reflected light from the liquid member to pass therethrough. Therefore, unnecessary reflected light other than the light reflected by the free surface of the liquid member is prevented from entering the light receiving means and hence the measurement can be done with a high accuracy.

What is claimed is:

1. An inclination sensor comprising:

a light source;

a first optical system for collimating the light emitted from said light source;

a scale pattern member for allowing the light from said first optical system to pass therethrough;

a half mirror for redirecting the light which has passed through said scale pattern member;

a liquid member having a free surface for reflecting the light being redirected by said half mirror;

a second optical system for focusing the light reflected by said liquid member;

a light receiving means for receiving a light image formed by said second optical system; and a processing means for calculating an inclination on the basis of a reception signal provided from said light receiving means;

said scale pattern member being constituted by a plurality of slits, and said half mirror being disposed on an optical path of both said liquid member and said second optical system.

2. An inclination sensor according to claim 1, wherein said light source and the surface of said liquid member are disposed in a conjugate relation to each other.

3. An inclination sensor according to claim 1 or claim 2, wherein said half mirror has a surface which is inclined relative to the light emitted from said light source.

4. An inclination sensor according to claim 1, wherein said liquid member is constituted integrally with said half mirror.

5. An inclination sensor according to claim 4, wherein said half mirror has a reflection preventing film formed on a surface thereof and which is in contact with said liquid member.

6. An inclination sensor according to claim 1, wherein the refractive index of said liquid member and that of said half mirror are of values approximate to each other.

7. An inclination sensor according to claim 1, wherein a first polarizing means is disposed on an optical path between said light source and said half mirror;

a λ/4 polarizing means is provided on a light transmitting side of said liquid member; and a second polarizing means is disposed which, for the light transmitted through said half mirror, permits only the light reflected from said liquid member to pass therethrough.

8. An inclination sensor according to claim 7, wherein said second polarizing means, is a polarizing reflective surface on said half mirror.

9. An inclination sensor according to claim 1 or claim 8, wherein said liquid member comprises a vessel having an upper surface which is inclined relative to the emitted light from said light source.

10. A surveying instrument having a body and comprising the inclination sensor described in claim 1 or claim 7, said inclination sensor being attached to the body of the surveying instrument to detect an inclination of said body.

* * * * *